United States Patent [19]

Huang

[11] Patent Number: 5,664,367
[45] Date of Patent: Sep. 9, 1997

[54] ARTISTIC FLOWER PLANTING CASE HANGABLE ON A BUILDING

[76] Inventor: Hsiu-Lin Huang, P.O. Box 90, Tainan, 704, Taiwan

[21] Appl. No.: 553,049

[22] Filed: Nov. 3, 1995

[51] Int. Cl.⁶ ........................................................ A47G 7/00
[52] U.S. Cl. .................... 47/40; 47/39; 248/311.2
[58] Field of Search ............................ 47/40, 39 C, 68, 47/67 R, 39 R; 248/311.2

[56] References Cited

U.S. PATENT DOCUMENTS

| | | | |
|---|---|---|---|
| 2,477,509 | 7/1949 | Burgesser | 47/40 |
| 2,967,691 | 1/1961 | Lehnbeuter et al. | 248/311.2 |
| 3,099,355 | 7/1963 | Kane | 47/40 |
| 3,331,524 | 7/1967 | Wiley, Jr. | 47/40 |
| 3,879,891 | 4/1975 | Jones, III | 47/40 |
| 4,102,080 | 7/1978 | Kojo | 47/67 |
| 4,623,113 | 11/1986 | Studebaker | 248/311.2 |
| 4,698,936 | 10/1987 | Helfman | 47/40 |
| 4,825,590 | 5/1989 | Cullinane | 47/67 |
| 5,118,059 | 6/1992 | Mainer | 248/215 |
| 5,191,746 | 3/1993 | Russell | 47/39 |

FOREIGN PATENT DOCUMENTS 336173  3/1959  Switzerland ................. 47/40

Primary Examiner—Randolph A. Reese
Assistant Examiner—Joanne C. Downs
Attorney, Agent, or Firm—Bacon & Thomas

[57] ABSTRACT

An artistic flower planting case hangable on a building terrace having a flower planting case and a hanging plate. The hanging plate is channel shaped and placed on an upper surface of a terrace wall of a building. The flower planting case is an elongated case with an upper open side, forming an interior for soil and flowers. The case is assembled with the hanging plate by bolts screwing into a plurality of threaded holes in a rear side of the flower planting case and a front side of the hanging plate.

5 Claims, 7 Drawing Sheets

ARTISTIC FLOWER PLANTING CASE HANGABLE ON A BUILDING

BACKGROUND OF THE INVENTION

This invention concerns an artistic flower planting case hangable on a building, particularly having a hanging plate fitted on a terrace wall for hanging a flower planting case along a front surface of the terrace wall for planting flowers therein.

Flower planting beds are formed on terraces of a building for planting flowers therein by means of reinforced concrete, and they often project out to hang in the air. Therefore, they are rather difficult to construct, necessitating a scaffold or a trestle and taking much time and labor.

SUMMARY OF THE INVENTION

This invention has been devised to offer an artistic flower planting case hangable on a building and attachable to a terrace wall of a building.

A feature of the invention is an artistic flower planting case made of metal and a channel shaped hanging plate made of metal and fitted on an upper surface of a terrace wall, with the flower planting case fixed firmly to the hanging plate and hanging along a front side of the terrace wall.

BRIEF DESCRIPTION OF DRAWINGS

This invention will be better understood by reference to the accompanying drawings, wherein.

DESCRIPTION OF THE PREFERRED EMBODIMENTS

Figure 1:
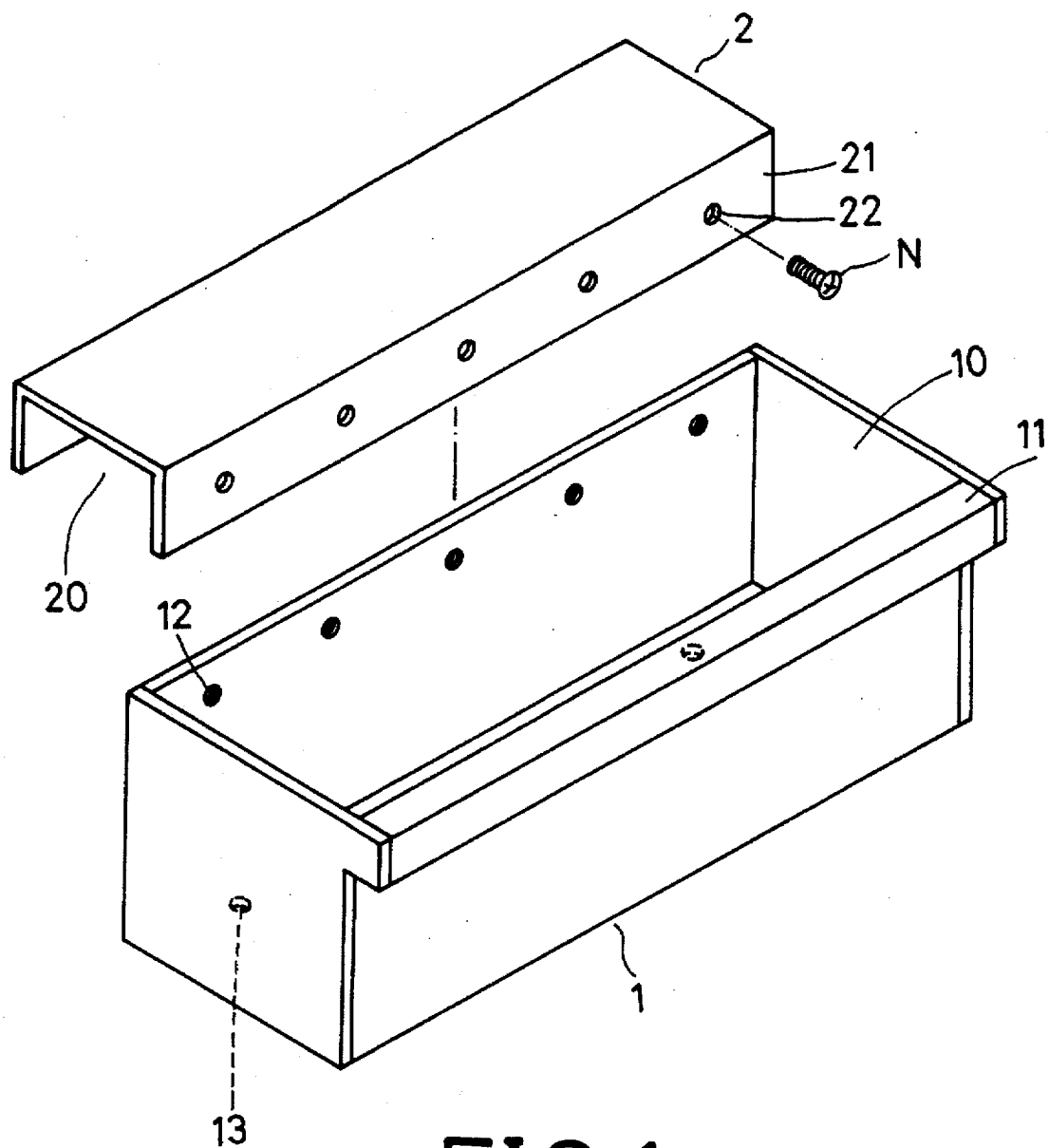
FIG. 1 is an exploded perspective view of a first preferred embodiment of an artistic flower planting case hangable on a building in the present invention.

A first preferred embodiment of an artistic flower planting case hangable on a building according to the present invention, as shown in FIG. 1, includes a flower planting case 1, and a hanging plate 2 combined together.

The flower planting case 1 is made of a metal, preferably elongated and of a rectangular cross-section, having an interior 10 defined by two opposite longitudinal sides, two opposite lateral sides, and a bottom side with a front upper projecting wall 11, a plurality of threaded holes 12 horizontally spaced equidistantly apart in an upper portion of a rear longitudinal side, and a plurality of drain holes 13 in the bottom side. The outer sides of the flower planting case 1 are galvanized or painted.

The hanging plate 2 is fixed together with the flower planting case 1 by means of bolts N in threaded holes 12, 22. The hanging plate 2 has a channel shape, i.e., an inverted U shape defining a longitudinal space 20, and a plurality of threaded holes 22 spaced equidistantly apart along a front longitudinal side 21.

Figure 2:
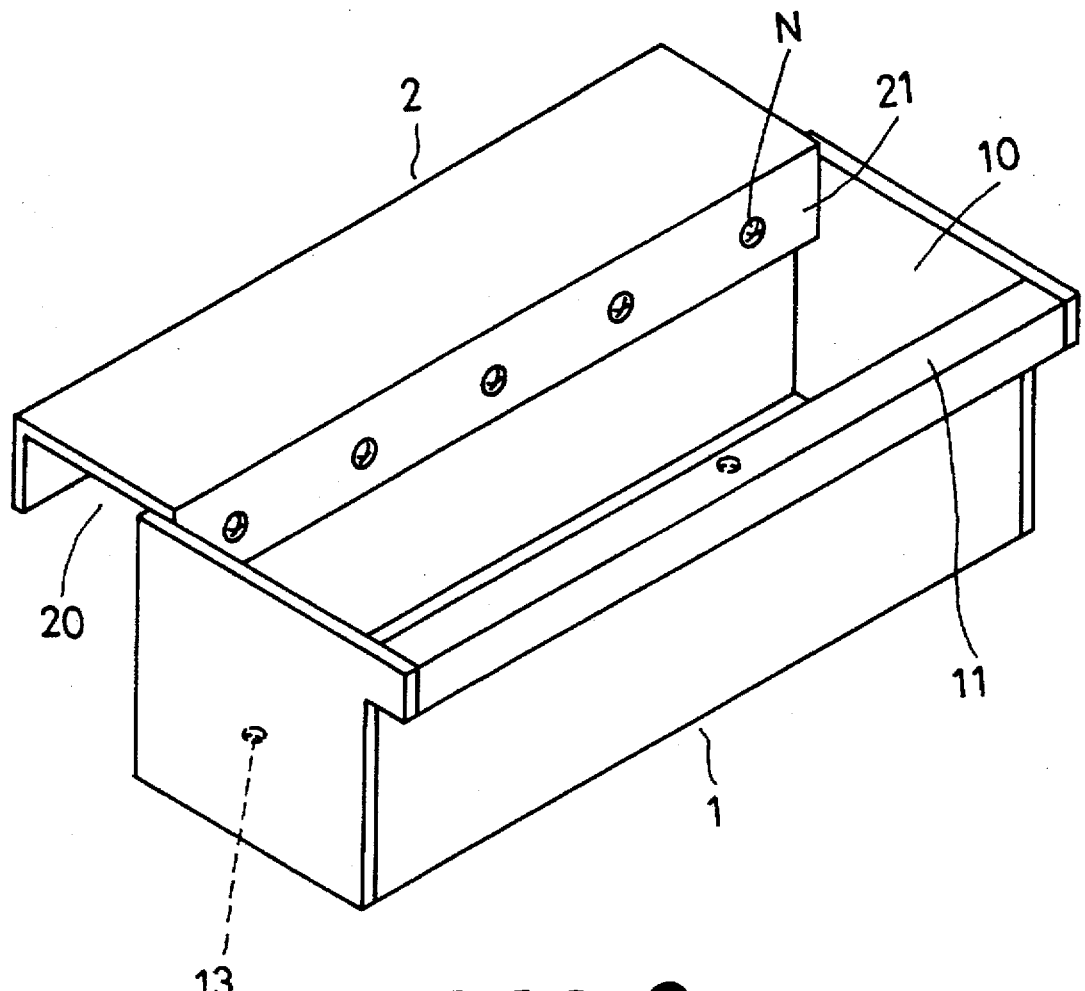
FIG. 2 is a perspective view of the first embodiment of an artistic flower planting case hangable on a building in the present invention.

In assembling, referring to FIG. 2, firstly, the front longitudinal side 21 of the hanging plate 2 is placed from above in the upper opening of the flower planting case 1, in front of the rear longitudinal side, with the threaded holes 22 of the front longitudinal side 21 facing the threaded holes 12 of the rear longitudinal side of the flower planting case 1. Bolts N are then screwed into the threaded holes 12 and 22, stably securing the flower planting case 1 with the hanging plate 2 so as to hang along a front side of a terrace wall.

Figure 3:
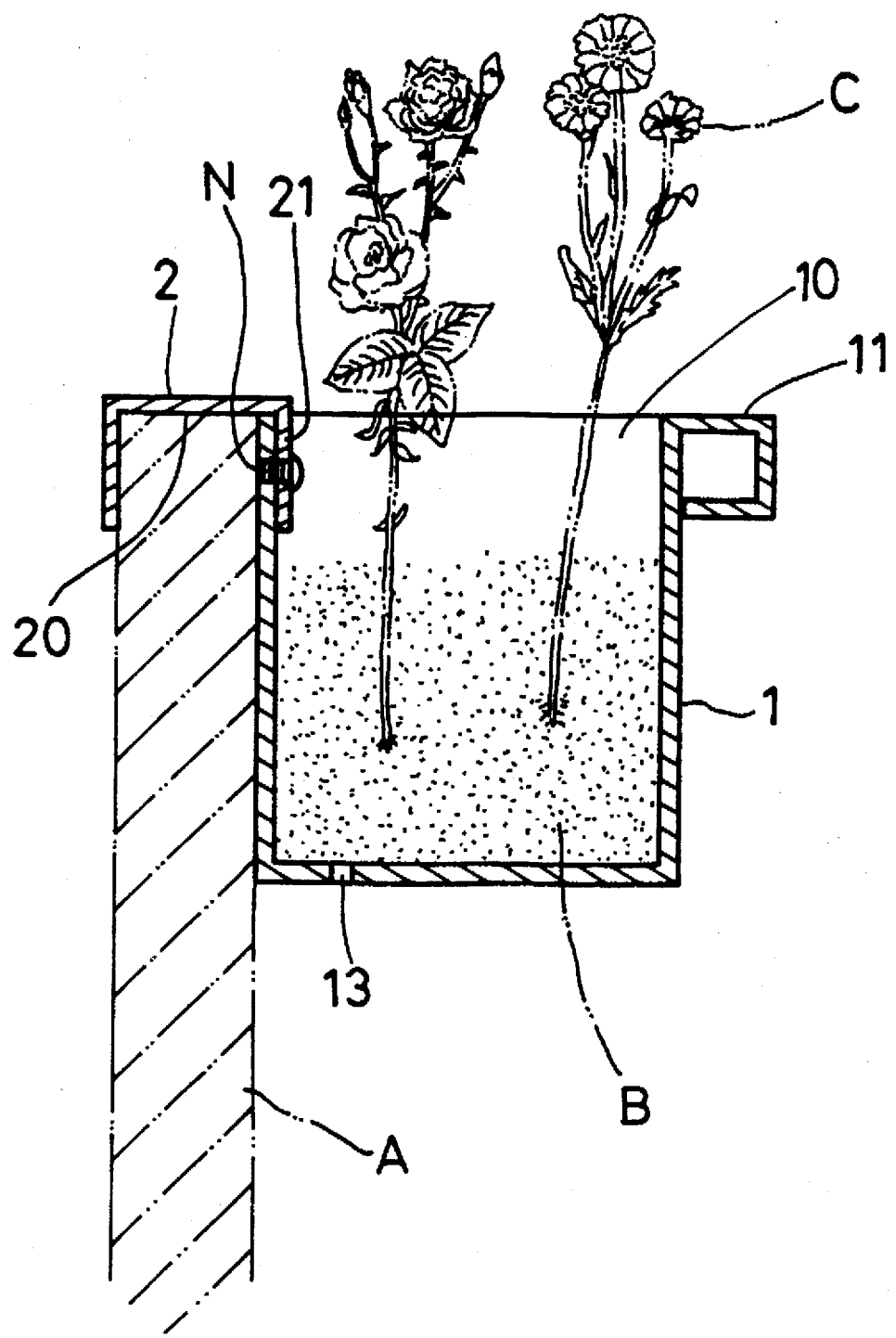
FIG. 3 is a side cross-sectional view of the first embodiment of an artistic flower planting case hangable on a building in the present invention, showing it being hung on a terrace wall of a building.

In use, referring to FIG. 3, the hanging plate 2 is placed on an upper surface of a terrace wall. A of a building, with the two longitudinal sides vertically contacting or nearly contacting the two longitudinal sides of the terrace wall. It should be noted that the width of the hanging plate 2 should be made to suit that of the terrace on which the hanging plate 2 is placed so that the hanging plate 2 may be secured stably. Then a proper volume of soil B is placed in the interior 10 of the flower planting case 1, and flowers are planted in the soil B. In case too much water is sprinkled on the flowers and the soil, water will flow out of the soil through the drain holes 13 in the bottom. The metal used for the flower planting case 1 is rustproofed for long use and kept from falling down by the hanging late 2 so as to avoid potential danger.

Figure 4:
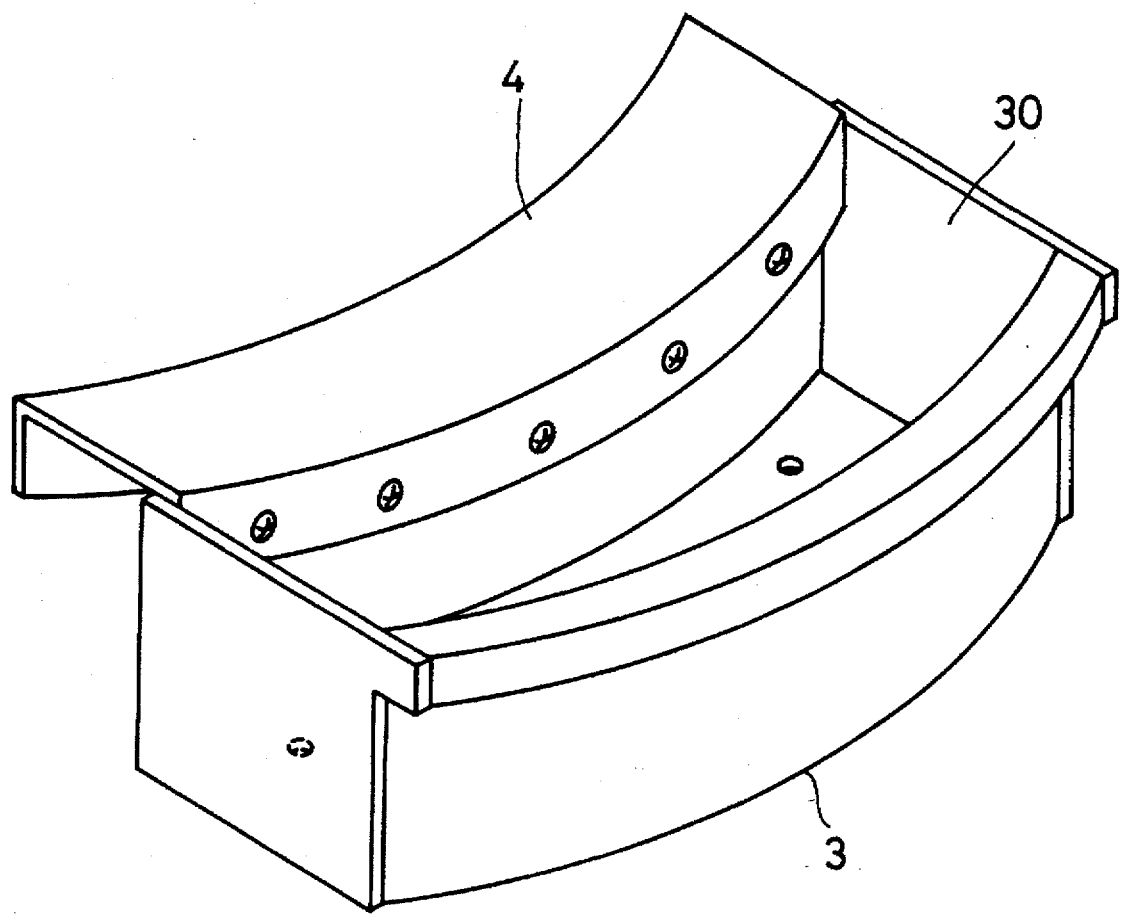
FIG. 4 is a perspective view of a second embodiment of an artistic flower planting case hangable on a building in the present invention.

A second preferred embodiment of an artistic flower planting case in the present invention, as shown in FIG. 4, includes a flower planting case 3 having two curved longitudinal sides defining a curved longitudinal interior, and a hanging plate 4 channel shaped with two longitudinal curved sides corresponding to the curved longitudinal rear side of the flower planting case 3. This second embodiment can be applied to a curved terrace wall.

Figure 5:
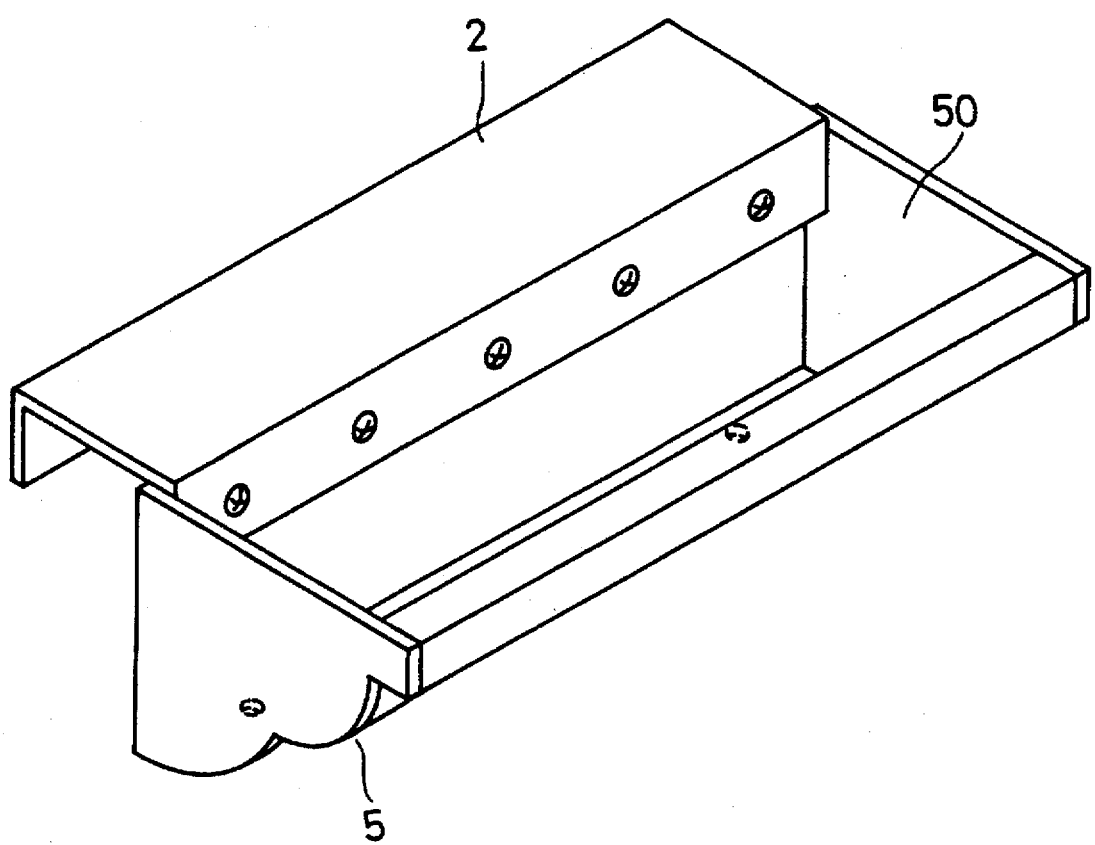
FIG. 5 is a perspective view of a third embodiment of an artistic flower planting case hangable on a building in the present invention.

A third preferred embodiment of an artistic flower planting case in the present invention is shown in FIG. 5. The flower planting case 5 may be shaped to have an interior 50 with a petal-shaped cross-sectional configuration.

Figure 6:
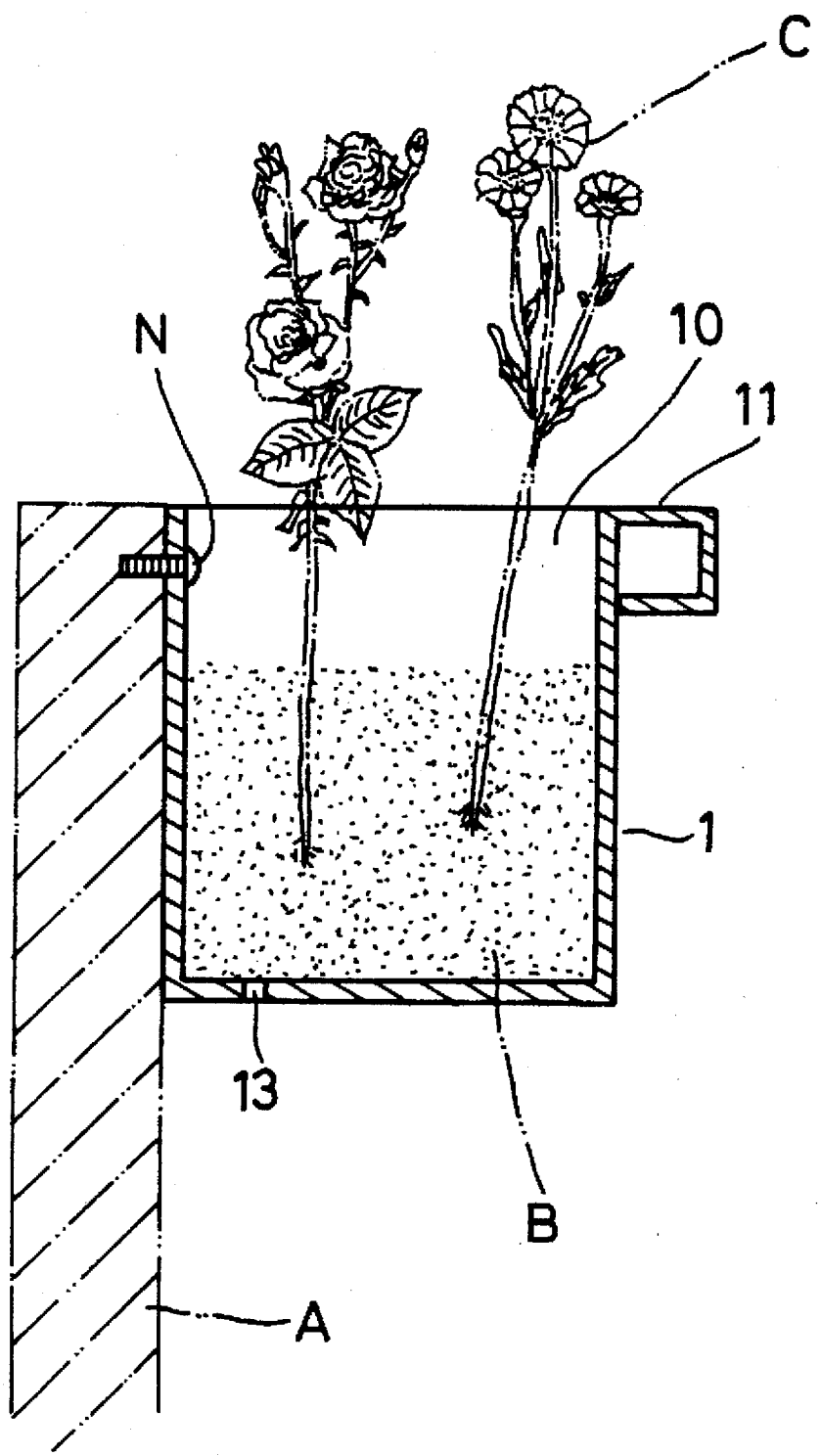
FIG. 6 is a side cross-sectional view of a fourth embodiment of an artistic flower planting case hangable on a building in the present invention, showing it being hung on a terrace of a building.
Figure 7:
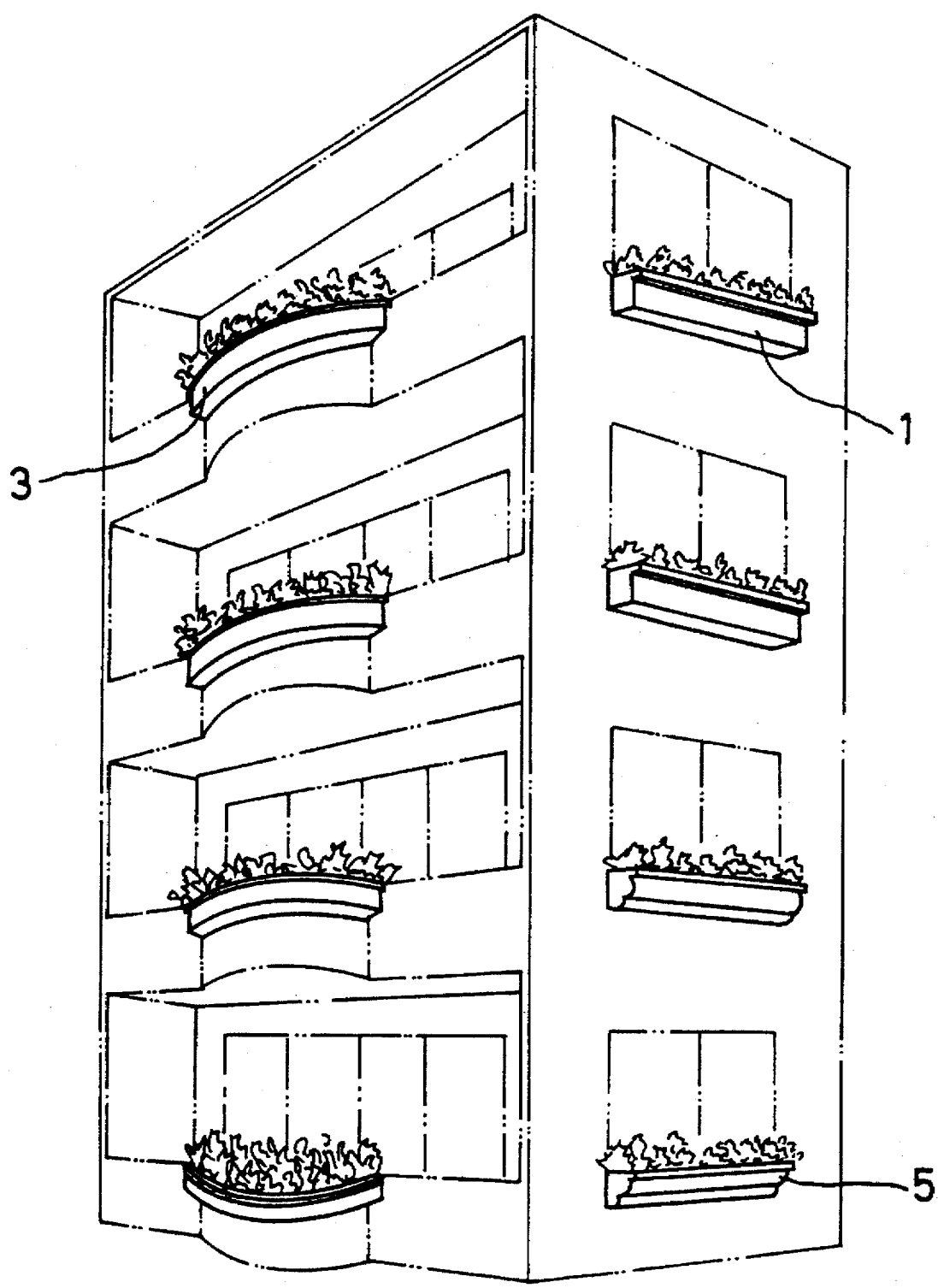
FIG. 7 is a perspective view of all the preferred embodiments of an artistic flower planting case in the present invention, showing them applied to variously shaped terraces of buildings.

The three preferred embodiments of an artistic flower planting case in the present invention, as shown in FIG. 6, can be used without the hanging plate 2 or 4, by directly fixing the flower planting case 1, 3 or 5 to a front vertical surface A of a terrace wall by the bolts N screwing through the threaded holes 12. Therefore, various embodiments of the present invention can be applied to variously shaped terrace walls of a building.

As can be understood from the above description, this invention has the following merits:

1. Its material is either a metal having rustproof property or stainless steel, lasting very long without corrosion, with drain holes provided to drain excessive water.

2. Its shape can be made to correspond to various shapes of terraces of buildings, and galvanized on its outer surface to augment its beautiful appearance.

While the preferred embodiments of the invention have been described above, it will be recognized and understood that various modifications may be made therein and the appended claims are intended to cover all such modifications which may fall within the spirit and scope of the invention.

What is claimed is:

1. A flower planting case hangable on a building wall and comprising:

a flower planting case having from and rear opposite longitudinal sides, two opposite lateral sides and a bottom side forming an interior, a plurality of spaced apart first threaded holes in an upper portion of the rear longitudinal side, and a plurality of drain holes in said bottom side;

an inverted "U" shaped hanging plate having an elongated channel configuration to fit on an upper surface of the building wall, the hanging plate having a plurality of spaced apart second threaded holes in a front longitudinal vertical portion of the inverted "U" shaped hanging plate, the locations of the second threaded holes corresponding to the locations of the first threaded holes of said flower planting case;

threaded fasteners extending into and engaging the first and second threaded holes to attach the flower planting case to the hanging plate; and, a reinforcement on the front longitudinal side of the flower planting case to augment the strength of the front longitudinal side.

2. The flower planting case hangable on a building wall as claimed in claim 1, wherein said flower planting case and said hanging plate are made of stainless steel.

3. The flower planting case hangable on a building wall as claimed in claim 1, wherein said interior of said flower planting case has a generally rectangular cross-sectional configuration.

4. The flower planting case hangable on a building wall as wall as claimed in claim 1, wherein said flower planting case has a galvanized outer surface.

5. The flower planting case hangable on a building wall as claimed in claim 1, wherein said reinforcement extends along an upper portion of the front longitudinal side.

* * * * *